July 7, 1959  W. C. WEHNER  2,893,503
VARIABLE SPEED ROTARY MOWERS
Original Filed April 4, 1955
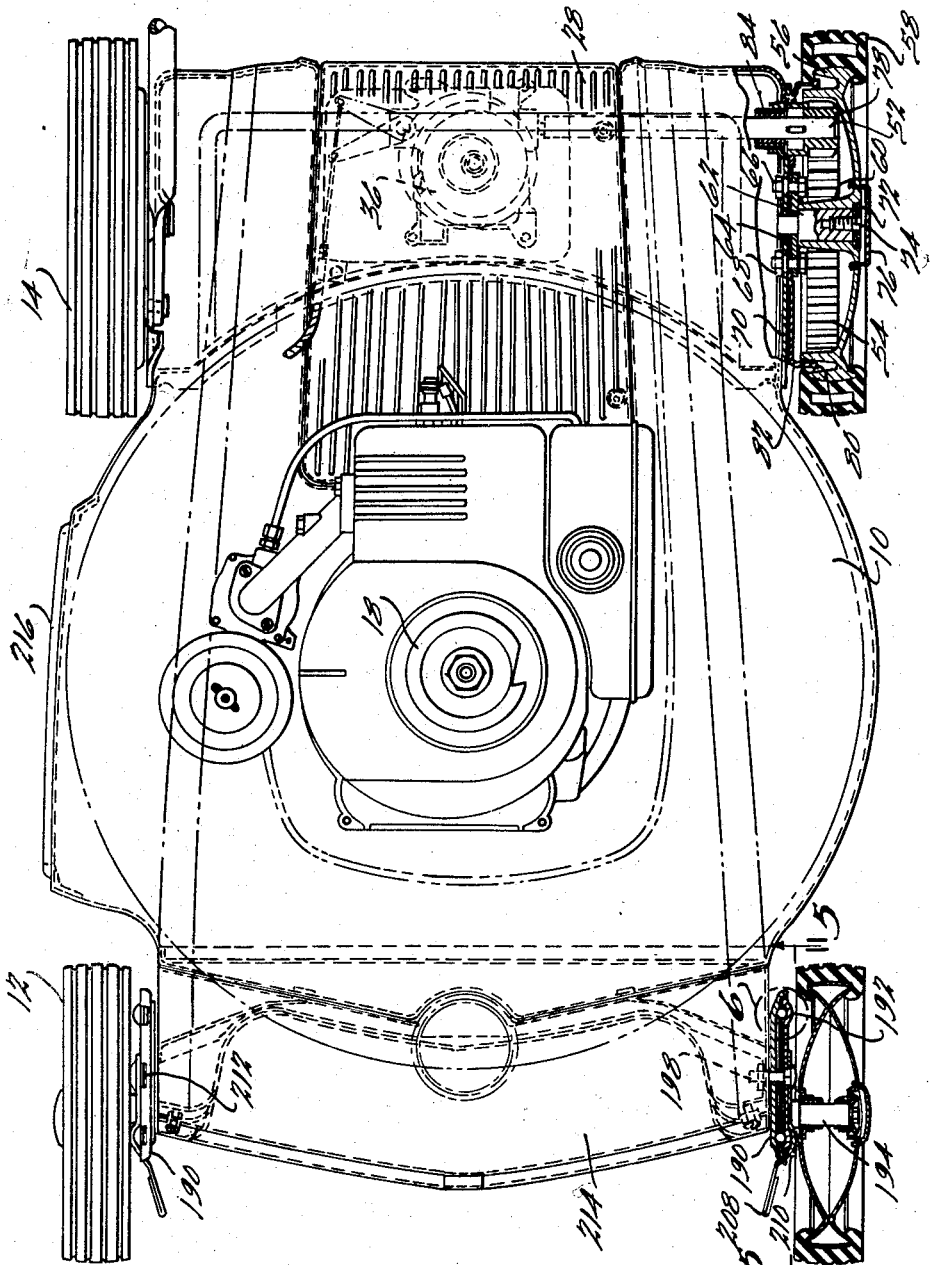
INVENTOR.
William C. Wehner
BY
Maxwell K. Murphy
ATTORNEY

United States Patent Office 2,893,503
Patented July 7, 1959

2,893,503

VARIABLE SPEED ROTARY MOWERS

William C. Wehner, Grosse Pointe, Mich., assignor, by mesne assignments, to Moto-Mower, Inc., a corporation of Delaware Original application April 4, 1955, Serial No. 498,997, now Patent No. 2,860,473, dated November 18, 1958. Divided and this application April 12, 1957, Serial No. 652,533

1 Claim. (Cl. 180—75)

This invention relates to lawn mowers of the rotary blade type and particularly to a driving wheel mounting for self-propelled mowers of this type, and this application is a division of my co-pending application Serial No. 498,997, filed April 4, 1955, now Patent No. 2,860,473.

Lawn mowers having a motor-driven, horizontally disposed blade have become increasingly popular in recent years because of their versatility. In the majority of rotary mowers now on the market, the engine is mounted such that the crankshaft thereof is vertically disposed and the cutter blade is mounted directly on the lower end of the crankshaft and rotates at engine speed. Because of this mounting of the engine, difficulty and expense have been encountered in providing a suitable power connection from the engine crankshaft to the wheels of the mower, and for this reason, the wheels of the machine are not driven in most instances.

In the drawings, the figure is a top plan view of the improved rotary mower with parts broken away to show sectional details of the wheel mounting.

Referring now to the drawings, it may be seen that the machine comprises a "deck" or chassis member 10 on which front wheels 12 and rear wheels 14 are mounted. The deck is of welded reinforced construction and carries the engine on the top surface thereof. The engine is preferably of the 4-cycle, internal combustion type although any other suitable engine, electric motor, or the like may be used.

The engine is mounted with its crankshaft vertically disposed. The crankshaft extends above the engine head and has a starting pulley 18 on the upper end. If desired, a recoil starter, electric starter, or similar device may be coupled to the shaft at this location.

It may be seen that the rear propelling wheels 14 are driven from the transmisison gearbox 36 by means of axle shafts 52. Each of the driving wheels comprises a casting having an integrally formed internal gear 54 and an integrally formed rim 56 on which is mounted a rubber tire 58.

The hub 60 of each wheel is rotatably carried on a stub axle 62 which is, in turn, carried by a plate assembly 64. The latter is secured to the deck structure by the bolts 66 which threadedly engage the weld nuts 68 fixed to the mounting plates 70. The wheel hub 60 has a counterbore which holds a felt seal 72 that is slightly compressed when the wheel mounting screw 74 is tightened. A hub cap 76 snaps into place over the end of the screw 74 to protect the hub and present a neat appearance.

The internal gear 54 is engaged by a pinion 78 carried on the outer end of the axle shaft 52 and driven from the shaft through a conventional differential pawl which provides a one-way drive to the wheel. A dirt-excluding spider 82 secured to the plate 70 seals the assembly against entry of dirt or water which might adversely affect quiet operation of the gear and pinion drive. The shaft 52 is self-aligning and is supported near its outer end by a bushing 84 carried by the plate 70.

The front wheels 12 are constructed of two identical stampings, welded together along a circumferential line medially intermediate the hub and rim portions as illustrated, the outer marginal portions being flared and bent over to form a rim adapted to mount a rubber tire.

I claim:

In a power lawnmower, in combination, a deck having a horizontal portion and a downwardly turned skirt portion, an engine mounted on said horizontal portion, driving wheels drivingly connected to said engine, means for mounting said driving wheels on said deck comprising, reinforcing plates secured to said skirt portion adjacent said wheels, a second plate having a wheel supporting stub axle secured thereto, means for securing said plates together and an outwardly facing annular seal member carried by said first plate and adapted to engage a wheel mounted on said stub axle in sealing relation.

References Cited in the file of this patent

UNITED STATES PATENTS

| | | |
|---|---|---|
| 994,019 | Maxwell | May 30, 1911 |
| 1,051,995 | Gundersen | Feb. 4, 1913 |
| 1,161,265 | Stewart | Nov. 23, 1915 |
| 1,291,816 | Fielder | Jan. 21, 1919 |
| 1,413,215 | Bowen | Apr. 18, 1922 |
| 1,420,299 | Will | June 20, 1922 |
| 1,749,189 | Mack | Mar. 4, 1930 |
| 2,151,615 | Potter | Mar. 21, 1939 |
| 2,417,613 | Radabaugh | Mar. 18, 1947 |
| 2,545,735 | Howard | Mar. 20, 1951 |
| 2,645,300 | Watts et al. | July 14, 1953 |
| 2,701,943 | Johnson | Feb. 15, 1955 |
| 2,722,281 | Falkenberg | Nov. 1, 1955 |